United States Patent [19]

Vogel

[11] Patent Number: 5,697,639

[45] Date of Patent: Dec. 16, 1997

[54] AIRBAG MODULE

[75] Inventor: Wolfgang Vogel, Hemmingen, Germany

[73] Assignee: Robert Bosch GmbH, Stuttgart, Germany

[21] Appl. No.: 679,406

[22] Filed: Jul. 9, 1996

[30] Foreign Application Priority Data

Jul. 15, 1995 [DE] Germany ............... 295 11 448 U

[51] Int. Cl.⁶ .................................................. B60R 21/26
[52] U.S. Cl. .................................... 280/735; 280/736
[58] Field of Search .............................. 280/735, 734, 280/736, 741, 742

[56] References Cited

U.S. PATENT DOCUMENTS

Re. 28,624   11/1975   Lewis et al. ........................ 280/736
5,411,289    5/1995    Smith et al. ........................ 280/735
5,413,378    5/1995    Steffens, Jr. et al. ............... 280/735
5,460,405    10/1995   Faigle et al. ....................... 280/735
5,564,743    10/1996   Marchant ........................... 280/741
5,613,702    3/1997    Goetz ............................... 280/735
5,626,359    5/1997    Steffens, Jr. et al. ............... 280/735

Primary Examiner—Christopher P. Ellis
Attorney, Agent, or Firm—Kenyon & Kenyon

[57] ABSTRACT

An airbag module of a safety device for vehicle occupants includes a temperature sensor. Output terminals of the temperature sensor are each connected via leads to one input terminal each of a firing element.

5 Claims, 1 Drawing Sheet

AIRBAG MODULE

BACKGROUND INFORMATION

An airbag module is described, for example, in U.S. Pat. No. 5,411,289. It provides for a temperature sensor in order to take the prevailing ambient temperature into consideration when an airbag is activated in the event of an accident. As is generally known, vehicles licensed for use in traffic and the subassemblies arranged in the vehicle are subjected to substantial temperature fluctuations. By taking these temperature fluctuations into account when an airbag is deployed (opened) to protect the occupants of a vehicle, an optimal deployment state can always be guaranteed.

SUMMARY OF THE INVENTION

The present invention provides an especially simple structural development of the airbag module, which with very few lead connections, renders possible a reliable triggering of the firing elements of the airbag module, as well as an operationally reliable evaluation of the output signals from the temperature sensor. Because of low material and assembly costs, a very favorable price can be achieved for the airbag module. Moreover, because of the small number of lead connections, a low susceptibility to failure and high operational reliability are attained.

BRIEF DESCRIPTION OF THE DRAWINGS

The Figure schematically depicts an exemplary embodiment of the safety device for vehicle occupants according to the present invention.

DETAILED DESCRIPTION

Figure 1:
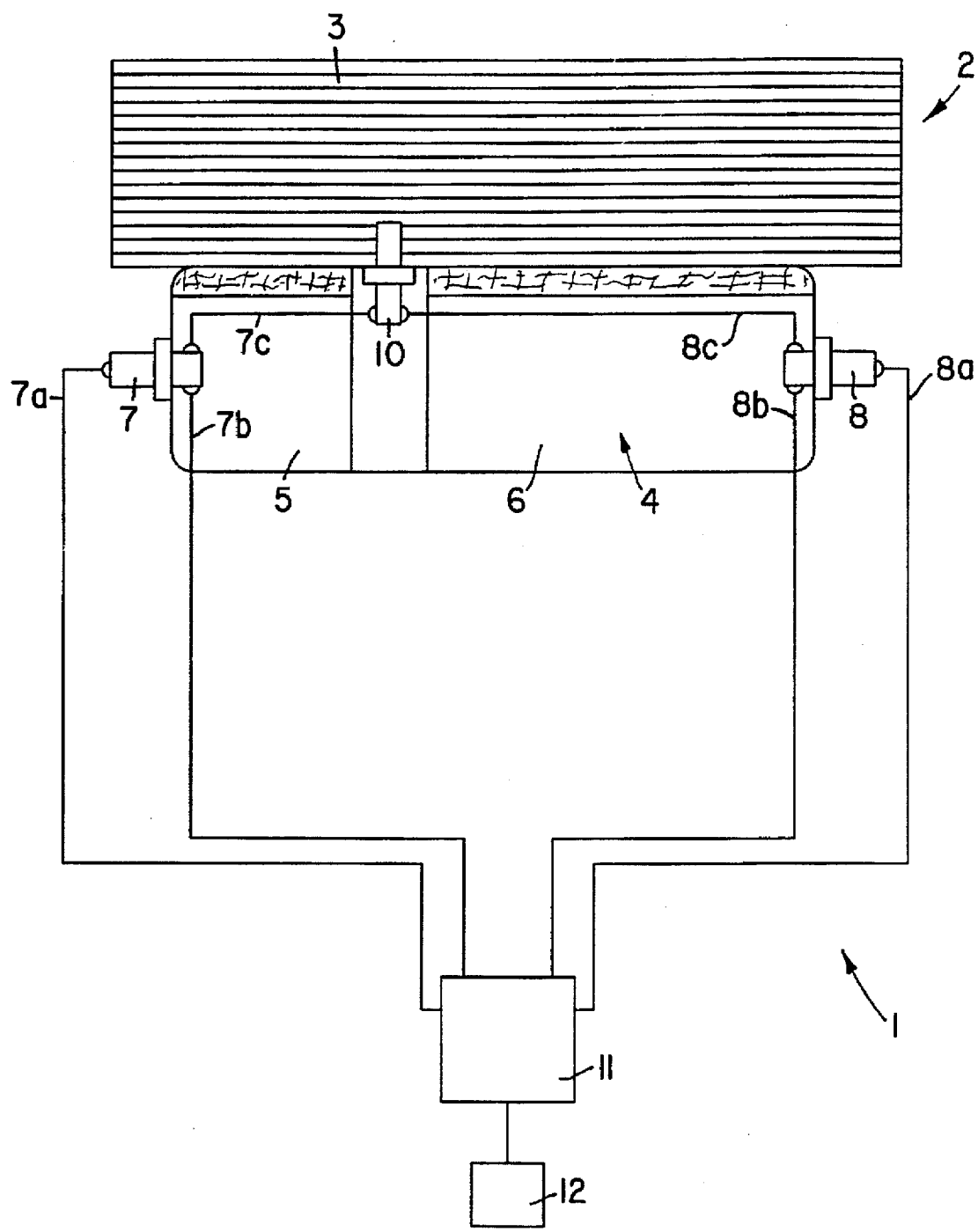

The safety device 1 for vehicle occupants comprises at least one acceleration sensor 12, whose output terminal is connected to the input terminal of a control unit 11. At least one airbag module 2 is linked to output terminals of the control unit 11. The acceleration sensor 12 detects vehicle acceleration values and supplies an output signal corresponding to the acceleration values to the input terminal of the control unit 11. This control unit 11 evaluates the output signal from the acceleration sensor 12 to determine whether a crash has occurred and, in the event of such a crash, triggers the airbag module 2. The airbag module 2 comprises an airbag 3 depicted in the undeployed (folded) state in the Figure, as well as a gas generator 4 that is operatively connected to this airbag 3.

In the illustrated exemplary embodiment, the gas generator 4 comprises two separate chambers 5, 6, in which are arranged propellant charges (not shown), which are able to be electrically ignited by means of associated firing elements 7, 8. After being ignited, these propellant charges develop propellant gases, which penetrate through a filter 9 into the undeployed airbag 4, causing it to deploy. Each firing element 7, 8 is linked via connector leads 7a, 7b, 8a, 8b to output terminals of the control unit 11. Disposed in the control unit 11 (not specifically shown in the drawing) are power output stages for triggering the firing elements 7, 8. When the firing elements 7, 8 are triggered, these power output stages supply a current to load the firing elements 7, 8. In addition, terminal leads 7c, 8c of the firing elements 7 and 8, respectively, are each connected to one output terminal of a temperature sensor 10 arranged in the airbag module 2.

This structural refinement results in an especially simple and favorable conductor arrangement, since only comparatively few connector leads are needed for triggering the firing elements 7, 8, on the one hand, and for evaluating the output signals from the temperature sensor, on the other hand. Through the selected circuit arrangement, the leads 7c, 8c connected to the output terminals of the temperature sensor 10 are linked, at the same time, to the leads 7b, 8b, which run from the control unit 11 to the firing elements 7, 8. Accordingly, the output signals from the temperature sensor 10 are also directly available at the control unit 11 and can, therefore, be evaluated by the control unit 11. As a function of the output signals supplied by the temperature sensor 10, the control unit 11 can decide, for example, whether merely one chamber of the two chambers 5, 6 of the gas generator 4 will be activated by triggering the firing element 7 or 8, or whether it is more expedient to ignite both chambers 5, 6 at the same time or in graded time.

As depicted in the Figure, it is beneficial for the temperature sensor 10 to be disposed inside the airbag module 2. It is especially advantageous to place the temperature sensor 10 so as to permit it to detect the ambient temperature in the vicinity of the airbag 3 and, if indicated, also the temperature of the propellant gases entering into the airbag 3. It is especially advantageous to devise the temperature sensor 10 in combination with at least one of the firing elements 7, 8 or, if indicated, with both firing elements 7, 8. This results in an especially compact subassembly, which then only needs to be connected via at least one four-pole plug-in connection to the control unit 11.

What is claimed is:

1. An airbag module comprising:

an inflatable airbag;

a gas generator;

first and second firing elements for activating the gas generator and, in turn, for inflating the inflatable airbag, in response to at least one signal from a control unit, the first and second firing elements having first and second input terminals, respectively; and a temperature sensor having first and second output terminals coupled to the first and second input terminals, respectively, of the first and second firing elements.

2. The airbag module according to claim 1, wherein the temperature sensor is disposed inside the airbag module.

3. The airbag module according to claim 2, wherein the temperature sensor detects an ambient temperature in a vicinity of the airbag.

4. The airbag module according to claim 1, wherein the temperature sensor is arranged in close proximity to at least one of the first and second firing elements.

5. The airbag module according to claim 1, wherein the temperature sensor is combined with the first and second firing elements to form a common subassembly.

* * * * *